US006820985B2

(12) United States Patent
Ookawa et al.

(10) Patent No.: US 6,820,985 B2
(45) Date of Patent: Nov. 23, 2004

(54) DISPLAY PANEL AND PRODUCTION METHOD THEREFOR

(75) Inventors: Masafumi Ookawa, Takatsuki (JP); Junichi Hibino, Neyagawa (JP); Yoshiki Sasaki, Shijounawate (JP); Katuyoshi Yamashita, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 138 days.

(21) Appl. No.: 10/257,557

(22) PCT Filed: Apr. 18, 2001

(86) PCT No.: PCT/JP01/03312

§ 371 (c)(1), (2), (4) Date: Oct. 11, 2002

(87) PCT Pub. No.: WO01/80276

PCT Pub. Date: Oct. 25, 2001

(65) Prior Publication Data

US 2003/0076039 A1 Apr. 24, 2003

(30) Foreign Application Priority Data

Apr. 19, 2000 (JP) ....................................... 2000-117468

(51) Int. Cl.[7] ................................................. G02B 5/12

(52) U.S. Cl. ....................... 359/513; 359/510; 359/511; 359/512; 359/513; 359/514

(58) Field of Search ................................. 359/513, 512, 359/514; 313/582, 583, 584, 585, 587, 634; 349/32, 587

(56) References Cited

U.S. PATENT DOCUMENTS 5,742,122 A 4/1998 Amemiya et al.
5,754,003 A 5/1998 Murai et al.
5,844,639 A 12/1998 Togawa
5,846,110 A 12/1998 Kanagu et al.
6,023,130 A 2/2000 Sakasegawa et al.
6,081,306 A 6/2000 Nagano

FOREIGN PATENT DOCUMENTS

| | | |
|---|---|---|
| EP | 945886 | 9/1999 |
| JP | 5865750 | 5/1983 |
| JP | 1113948 | 7/1989 |
| JP | 5342992 | 12/1993 |
| JP | 729497 | 1/1995 |
| JP | 8167380 | 6/1996 |
| JP | 8185802 | 7/1996 |
| JP | 8250029 | 9/1996 |
| JP | 917343 | 1/1997 |
| JP | 59105919 | 4/1997 |
| JP | 9259754 | 10/1997 |
| JP | 10269935 | 10/1998 |
| JP | 11204040 | 7/1999 |
| JP | 200082401 | 3/2000 |

*Primary Examiner*—Mohammad Sikder

(57) ABSTRACT

To provide a display panel, such as a PDP, that can reduce noise caused by a collision sound which occurs when a front panel member and a back panel member vibrate while the display panel is being driven. Projections (21) are provided on a surface of a first panel member facing a second panel member. The first panel member and the second panel member are connected to each other by a connecting material in areas (23) where the projections intersect barrier ribs (18). In this way, noise (noise level) caused by a collision sound which occurs when the front panel member and the back panel member vibrate while the display panel is being driven can be reduced.

6 Claims, 15 Drawing Sheets

DISPLAY PANEL AND PRODUCTION METHOD THEREFOR

TECHNICAL FIELD

The present invention relates to a display panel and a manufacturing method for the display panel. The invention in particular relates to a panel construction that efficiently reduces noise.

BACKGROUND ART

PDPs (plasma display panels), which are one type of gas discharge panel, are currently receiving high expectations as large displays that can realize screen sizes of forty inches or more. PDPs are self-luminous type and have excellent properties such as fast responsiveness and wide viewing angles. In addition, PDPs can be manufactured relatively easily. For these reasons, PDPs are known to be suitable for large displays.

FIG. 1 shows an AC (alternating current) PDP. This PDP has a front panel member 100 and a back panel member 200 which are put facing each other. The front panel member 100 and the back panel member 200 are sealed together by a sealing material (not illustrated) which is interposed at the outer edges of their facing surfaces.

The sealing is done in the following way. First, the two facing panel members, which are held by a clip or the like at their outer edges, are heated to soften the sealing material. After this, the construction is cooled to cure the sealing material.

When the sealing is done in this way, however, the center of the construction may bulge above and below to some extent, as shown in FIG. 2. This being so, during actual drive time (when the PDP is actually driven), small vibrations occur in areas where the two sealed panel members are in contact with each other, especially in areas 203 where barrier ribs 202, which are provided in the back panel member 200 to form channels for phosphor layers 201, are in contact with the front panel member 100. Such vibrations may incur collision sounds, thereby causing noise. If the noise level of such noise increases, user discomfort intensifies. For example, a large display such as a PDP may be placed in a relatively quiet location such as a hospital as a guide display. In this case, noise is likely to be very noticeable. For this reason, panels that generate noise will end up being defective products.

On display panels such as PDPs that are driven according to a frame timesharing image display method, one frame of image is displayed by repeating four operations of set-up, write, illumination sustain, and erase. Note here that the aforementioned actual drive time refers to the time during which the panel undergoes the repetition of these operations.

Also, a panel that does not generate noise under normal conditions may generate noise when used at high altitudes of several thousand meters. This can be explained as follows. The panel inherently has small bulges, but is kept from bulging because the front and back panel members are pressed from outside due to the difference between the gas filling pressure inside the panel and the atmospheric pressure. However, when used at high altitudes, the difference between the internal pressure and the atmospheric pressure decreases, and so the forces that press the front and back panel members from outside weaken. This causes the panel to bulge.

DISCLOSURE OF INVENTION

The present invention was conceived in view of the problem described above, and has an object of providing a display panel such as a PDP that can reduce noise caused by collision sounds which occur when a front panel member and a back panel member vibrate during actual drive.

The stated object can be achieved by a display panel including a first panel member and a second panel member which are set facing each other, wherein the first panel member has a first electrode, the second panel member has a second electrode, and an image is displayed according to a frame timesharing image display method by applying voltages to the first electrode and the second electrode, characterized in that a noise level of noise in a frequency range of 20 Hz to 20 kHz, which occurs in a display area when the first panel member and the second panel member vibrate while the display panel is being driven, is no greater than 30 dB.

The present invention focuses on a band of frequencies 20 Hz to 20 kHz which correspond to the sounds human ears can detect (audible sounds), and limits a noise level to 30 dB or below in this frequency range. The noise level referred to here is ten times the common logarithm of the ratio of A-weighted squared sound pressure to the squared reference sound pressure of 20 $\mu$Pa. That is, the noise level is the A-weighted sound pressure level (see JIS (Japanese Industrial Standards) Z8731). In other words, the present invention reduces a noise level focusing only on a band of frequencies of sounds which are audible to humans as noise, since sounds of other frequencies not audible to humans do not pose any problem in this case. Noise is especially likely to occur during a set-up operation which is frequently repeated within one frame using relatively large voltages. Therefore, it is of particular importance to reduce a noise level in display panels that employ the frame timesharing image display method.

As a measuring instrument, a device that complies with JIS C1505-1988 or IEC (International Electrotechnical Commission) 60651 or 60804 is used. One example of such a device is precision integrating sound level meter NL-14 with 1/1 or 1/3 octave filter model NX-05 (produced by RION Co., Ltd). Measurements are performed with a microphone positioned at a vertical distance of 50 mm from the glass substrate on the panel display surface (with an entry angle of 0°).

First, the noise level of background noise is measured in the state where the panel is not emitting light. Here, it is preferable to perform measurements at several locations on the panel display surface. These measurements are carried out while varying the center frequency of a filter from 20 Hz to 20 kHz. Next, the noise level is measured at the same locations in the state where a monochromatic (e.g. white color) fixed display is being performed on the entire panel display surface, in the same way as above. The value obtained by subtracting the noise level measured during non-illumination from the noise level measured during illumination is the noise level of noise which occurs during actual drive.

The stated object can also be achieved by a display panel including a first panel member and a second panel member which has a plurality of strip-shaped barrier ribs, the first panel member and the second panel member being sealed together by a sealing material that is provided between the first panel member and the second panel member in a peripheral area which surrounds the plurality of barrier ribs, characterized in that the first panel member and the second panel member are connected to each other by a connecting material that is provided on top of at least one of the plurality of barrier ribs.

With this construction, the noise level of noise in the frequency range of 20 Hz—20 kHz, which occurs in the image display area when the first panel member and the second panel member vibrate during actual drive, can be limited to 30 dB or below.

Here, if the connecting material is provided on the entire top surface of each barrier rib, there will be no gaps between the first panel member and the second panel member. Hence the occurrence of crosstalk can be prevented.

Also, even when the panel is used at high altitudes of several thousand meters, the center of the panel is kept from bulging. This keeps noise and crosstalk from increasing.

The stated object can also be achieved by a display panel including a first panel member and a second panel member which has a plurality of strip-shaped barrier ribs, the first panel member and the second panel member being sealed together by a sealing material that is provided between the first panel member and the second panel member in a peripheral area which surrounds the plurality of barrier ribs, characterized in that the first panel member and the second panel member are connected to each other by a connecting material that is provided in a non-display area.

The stated object can also be achieved by a display panel including a first panel member and a second panel member which has a plurality of strip-shaped barrier ribs, the first panel member and the second panel member being sealed together by a sealing material that is provided between the first panel member and the second panel member in a peripheral area which surrounds the plurality of barrier ribs, characterized in that a projection is formed on a surface of the first panel member facing the second panel member, and the first panel member and the second panel member are connected to each other by a connecting material in areas where the projection intersects the plurality of barrier ribs.

With these constructions, the noise level of noise in the frequency range of 20 Hz—20 kHz, which occurs in the image display area when the first panel member and the second panel member vibrate during actual drive, can be limited to 30 dB or below.

Also, even when the panel is used at high altitudes of several thousand meters, the center of the panel is kept from bulging. This prevents noise and crosstalk from increasing.

Here, the display panel may further include a plurality of light emission cells that are aligned with intervals, wherein the projection is formed between adjacent light emission cells.

With this construction, the connecting material is kept from entering into the cells, with it being possible to prevent a decrease in cell opening ratio.

Here, the projection may have a shape of a continuous strip that extends from one side of a display area to an opposite side of the display area so as to be orthogonal to the plurality of barrier ribs, the display area being defined by the alignment of the plurality of light emission cells.

Here, the projection may have a shape of a plurality of dots.

Here, the projection between adjacent light emission cells may be formed using a dark-color material.

Here, the first panel member may have a dielectric layer, wherein the projection is formed on the dielectric layer using a same material as the dielectric layer.

The stated object can also be achieved by a manufacturing method for a display panel including a first panel member and a second panel member which has a plurality of strip-shaped barrier ribs, the first panel member and the second panel member being sealed together by a sealing material that is provided between the first panel member and the second panel member in a peripheral area which surrounds the plurality of barrier ribs, characterized by including the steps of: providing, before the first panel member and the second panel member are sealed together, the sealing material in a peripheral area of the first panel member or the second panel member so as to form a height that is greater than a height of the plurality of barrier ribs; and sealing, after the sealing material providing step, the first panel member and the second panel member by softening the sealing material while pressing the first panel member and the second panel member against each other in an area which is more central than the peripheral area.

With this method, the sealing is performed so that there will be no gaps between the barrier ribs and the first panel member. Accordingly, the noise level of noise in the frequency range of 20 Hz—20 kHz, which occurs in the image display area when the first panel member and the second panel member vibrate during actual drive, can be limited to 30 dB or below.

Here, in the sealing step, the first panel member and the second panel member may be pressed against each other in a center area.

Here, in the sealing step, the pressing may be performed using a difference between a pressure inside the display panel and a pressure outside the display panel.

Here, in the sealing step, the pressing may be performed using a magnetic force between magnets of opposite polarity which are positioned so that the first panel member and the second panel member lie therebetween.

Here, in the sealing material providing step, the sealing material may be provided so as to form a height that is no smaller than a sum of the height of the plurality of barrier ribs and an amount of deflection, waviness, and warping of the first panel member and the second panel member.

The stated object can also be achieved by a display panel including a first panel member and a second panel member which has a plurality of strip-shaped barrier ribs, the first panel member and the second panel member being sealed together by a sealing material that is provided between the first panel member and the second panel member in a peripheral area which surrounds the plurality of barrier ribs, characterized by being manufactured by: providing, before the first panel member and the second panel member are sealed together, the sealing material in a peripheral area of the first panel member or the second panel member so as to form a height that is greater than a height of the plurality of barrier ribs; and sealing, after the sealing material is provided, the first panel member and the second panel member by softening the sealing material while pressing the first panel member and the second panel member against each other in an area which is more central than the peripheral area.

With this construction, the sealing is performed with there being no gaps between the barrier ribs and the first panel member. Accordingly, the noise level of noise in the frequency range of 20 Hz—20 kHz, which occurs in the image display area when the first panel member and the second panel member vibrate during actual drive, can be limited to 30 dB or below.

BEST MODE FOR CARRYING OUT THE INVENTION

The following is a description of embodiments of the present invention with reference to drawings.

First Embodiment

Figure 1:
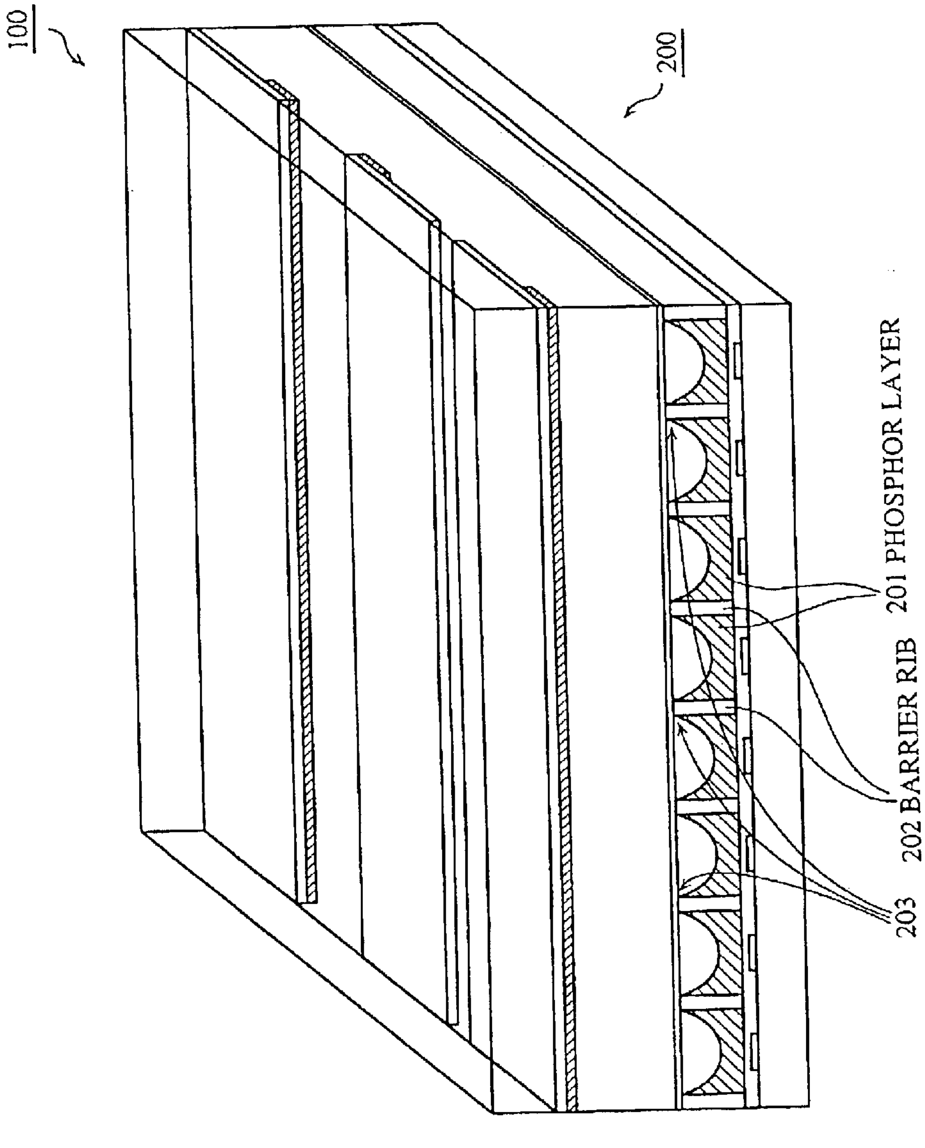
FIG. 1 is a perspective view showing a relevant part of a construction of a conventional PDP.
Figure 2:
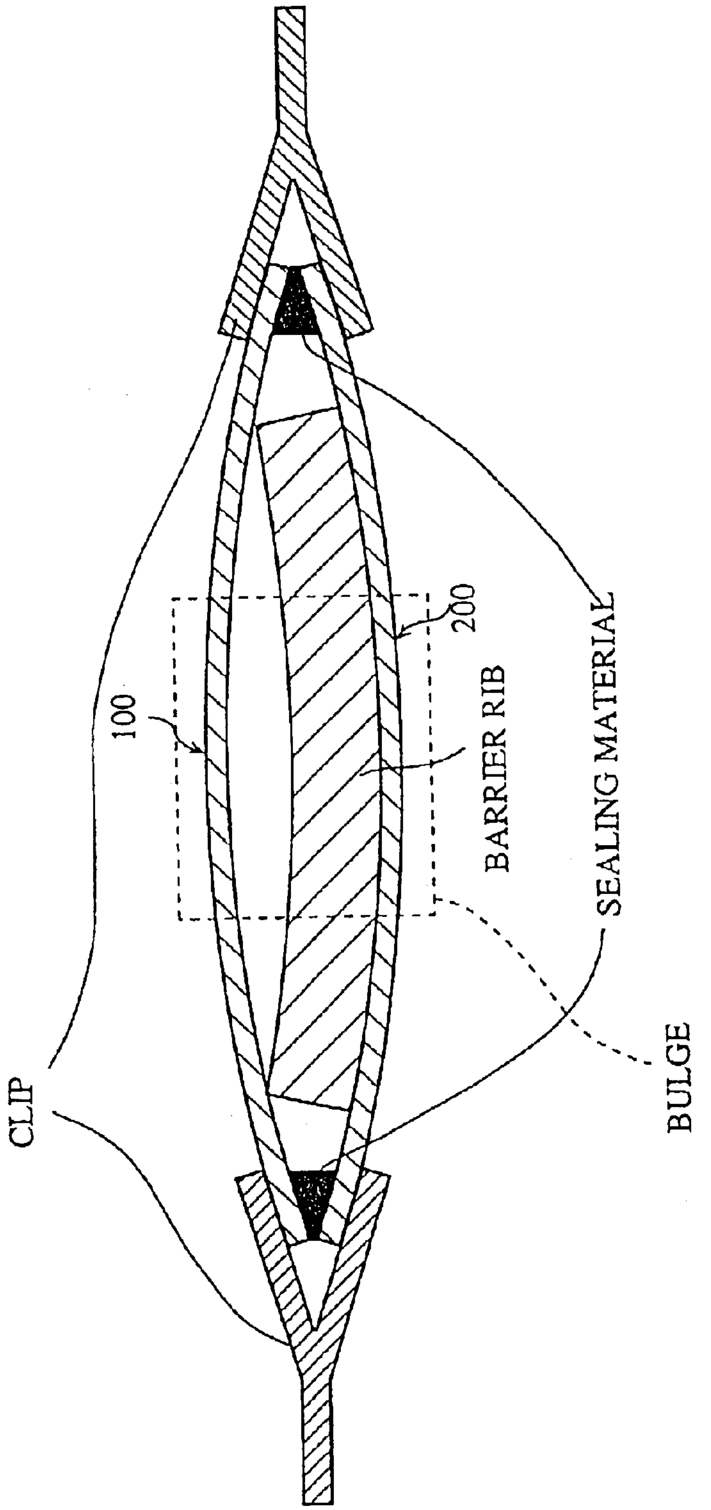
FIG. 2 illustrates a conventional sealing process.
Figure 3:
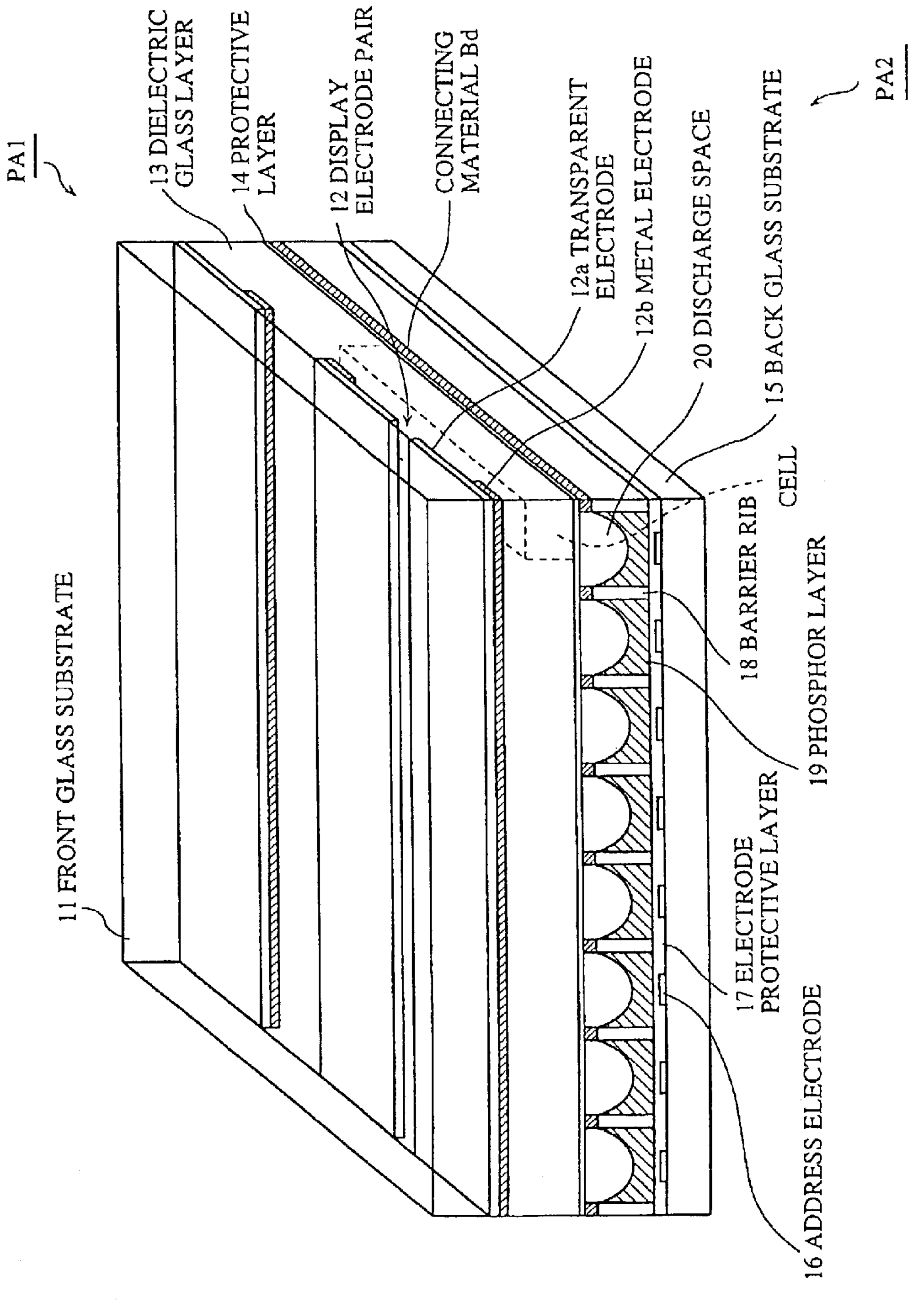
FIG. 3 is a perspective view showing a relevant part of a construction of a PDP to which the first embodiment of the invention relates.

The following describes a PDP which is the first embodiment of the present invention. FIG. 3 is a perspective view showing a relevant part of the PDP. Though only several cells are shown in the drawing, actually a large number of cells of the colors red, green, and blue are arranged in turn.

The PDP has a construction in which a front panel member PA1 and a back panel member PA2 are connected to each other by a connecting material, and also sealed together with a sealing material (not illustrated) that is provided at the outer edges of their facing surfaces.

This PDP is a surface discharge AC PDP that is driven in the following way. A pulse voltage is applied to each electrode to cause discharge to occur in the inner spaces (discharge spaces 20) between the front panel member PA1 and the back panel member PA2. Due to this discharge, visible light of each color is emitted from the back panel member PA2 and passes through the main surface of the front panel member PA1.

The front panel member PA1 has the following construction. Display electrode pairs 12 are arranged in stripes on a front glass substrate 11. A dielectric glass layer 13 is formed on the front glass substrate 11 so as to cover the display electrode pairs 12. Finally, a protective layer 14 is formed over the dielectric glass layer 13. Each electrode out of the display electrode pairs 12 is made up of a transparent electrode 12*a* formed on the front glass substrate 11 and a metal electrode 12*b* formed on the transparent electrode 12*a*.

The back panel member PA2 has the following construction. Address electrodes 16 are arranged in stripes on a back glass substrate 15 to cross over the display electrode pairs 12 at right angles. An electrode protective layer 17 is formed on the back glass substrate 15 so as to cover the address electrodes 16. The electrode protective layer 17 serves to protect the address electrodes 16 and also to reflect visible light toward the front panel member PA1. Barrier ribs 18 are projected from the electrode protective layer 17, so as to extend in the same direction as and alternate with the address electrodes 16. Phosphor layers 19 are provided between adjacent barrier ribs 18.

This being so, the inner spaces where the display electrode pairs 12 and the address electrodes 16 cross each other are cells for light emission.

Further, a connecting material Bd is provided uniformly on the top surface of each barrier rib 18 which is formed in the back panel member PA2. The connecting material Bd connects to the inner surface of the front panel member PA1, i.e., the surface of the protective layer 14.

Thus, the front panel member PA1 and the back panel member PA2 are connected to each other at the top surfaces of the barrier ribs 18 via the connecting material Bd. According to this construction, noise caused by vibrations of the substrates during actual drive is very small, with it being possible to limit the noise level to 30 dB or below. Since the top surfaces of the barrier ribs 18 are connected to the front panel member PA1, even when used at high altitudes of several thousand meters with low atmospheric pressure, the bulge of the front panel member PA1 and back panel member PA2 incurred by the difference between the internal pressure and the atmospheric pressure can be avoided. Thus, the PDP has excellent noise reduction effects.

The noise level varies depending on how many barrier ribs 18 are provided with the connecting material Bd. So long as at least one barrier rib 18 is connected to the front panel member PA1 at the center of the image display area, the noise level can be limited to 30 dB or less. Accordingly, when all barrier ribs 18 are connected to the front panel member PA1 as above, the noise level can be reduced to substantially zero.

Also, since there are no gaps between the top surfaces of the barrier ribs 18 and the front panel member PA1, no crosstalk occurs.

The following gives a general description of a method for manufacturing the above PDP.

(Manufacture of the Front Panel Member PA1)

The front panel member PA1 is manufactured in the following manner. The display electrode pairs 12 are formed on the front glass substrate 11. The dielectric glass layer 13 is formed over the display electrode pairs 12. Lastly the protective layer 14 is formed on the dielectric glass layer 13.

Each electrode out of the display electrode pairs 12 is formed as follows. A transparent electrode 12*a* which is made of a metal oxide, such as ITO, that has transparency and conductivity is formed using sputtering or the like. Following this, a silver paste is applied on the transparent electrode 12*a* using a method such as screen printing or ink-jet, to form a pattern of a metal electrode 12*b*. The result is then fired to form a display electrode. Here, the metal electrode 12*b* may have a three-layer structure of Cr—Cu—Cr.

The dielectric glass layer 13 is formed as follows. A composite formed by mixing a plurality of inorganic substances with an organic binder (10% of ethyl cellulose being dissolved in α-terpineol) is applied using a printing method such as screen printing. As one example, the plurality of inorganic substances are 70% by weight of lead oxide [PbO], 15% by weight of boron oxide [$B_2O_3$], 10% by weight of silicon oxide [$SiO_2$], and 5% by weight of aluminum oxide. The result is then fired at a predetermined temperature (e.g. about 500° C.) for a predetermined period (e.g. about 20 minutes), to obtain a predetermined film thickness (e.g. 30 μm).

The protective layer 14 is made of magnesium oxide [MgO], and is formed using a method such as electron-beam evaporation.

(Manufacture of the Back Panel Member PA2)

The back panel member PA2 is manufactured in the following manner. The address electrodes 16 are formed on the back glass substrate 15. The electrode protective layer 17 is formed over the address electrodes 16. The barrier ribs 18 are formed on the electrode protective layer 17. Lastly the phosphor layers 19 are formed between adjacent barrier ribs 18.

Here, the address electrodes 16 are formed by applying a silver paste on the back glass substrate 15 using a method such as screen printing or ink-jet, in the same way as the metal electrodes 12*b*.

The electrode protective layer 17 is a thin film of a glass composite which is similar to that used for the dielectric glass layer 13 but contains a powder of titanium oxide [$TiO_2$]. The electrode protective layer 17 is formed by printing the material over the address electrodes 16 using a printing method such as screen printing, and then firing the result.

The barrier ribs 18 are formed by applying a barrier rib forming material using a method such as screen printing, lift-off, or sandblasting, and then firing the result.

The phosphor layers 19 may be formed by printing a phosphor paste using a general method such as screen printing, and firing the result. Alternatively, the phosphor layers 19 may be formed by spraying a phosphor ink from a nozzle, and firing the result.

Materials that are usually used to form phosphor layers in a PDP can be used. Specific examples are given below:

Red phosphor: $Y_2O_3$:$Eu^{3+}$

Green phosphor: $Zn_2SiO_4$:Mn

Blue phosphor: $BaMgAl_{10}O_{17}$:$Eu^{2+}$ (Completion of the PDP by Sealing the Panel Members)

The connecting material Bd is provided on the top surfaces of the barrier ribs 18. After this, the construction is fired with the protective layer 14 of the front panel member PA1 being pressed against the back panel member PA2, to seal the front panel member PA1 and the back panel member PA2 together so that the display electrode pairs 12 cross over the address electrodes 16 at right angles.

The connecting material Bd may be a paste that is obtained by kneading a frit with a resin such as acrylic and a solvent such as terpineol. The frit can be formed by mixing low-melting point glass with a powder of ceramics or the like.

Lastly, a discharge gas (e.g. an inert gas of He—Xe or Ne—Xe) is enclosed in the discharge spaces 20 which are partitioned by the barrier ribs 18, at a predetermined pressure. This completes the PDP.

Any method can be used to provide the connecting material Bd on top of the barrier ribs 18, as long as it is suitable to apply the connecting material Bd to a narrow area on top of each barrier rib 18. For example, the connecting material Bd can be applied using a method such as screen printing or photolithography.

Second Embodiment

The second embodiment differs with the first embodiment in the construction of the front panel member PA1 and in the connection structure of the front panel member PA1 and back panel member PA2. The following explains the differences with the first embodiment.

Figure 4:
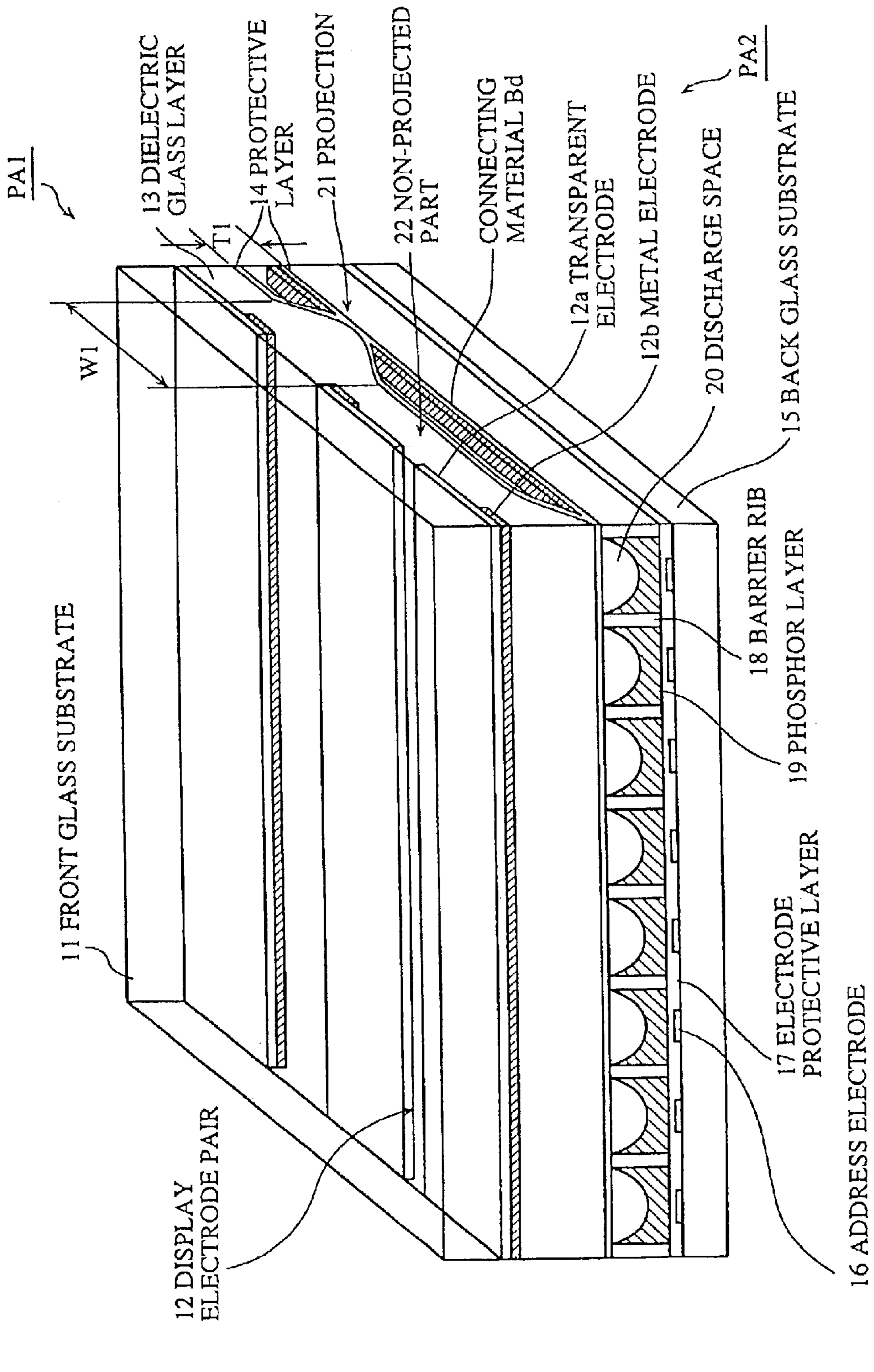
FIG. 4 is a perspective view showing a relevant part of a construction of a PDP to which the second embodiment of the invention relates.

As shown in FIG. 4, projections 21 in the form of stripes are arranged on the inner surface of the front panel member PA1 at regular intervals, so as to be parallel to the display electrode pairs 12 and orthogonal to the barrier ribs 18. As one example, each projection 21 has a width W1 that is substantially equal to a non-display gap between adjacent display electrode pairs 12 and a thickness T1 that is about 3 to 10 μm relative to a non-projected part 22.

This being so, the front panel member PA1 and the back panel member PA2 are connected to each other in the areas where the barrier ribs 18 cross the projections 21 on the inner surface of the front panel member PA1.

Figure 5:
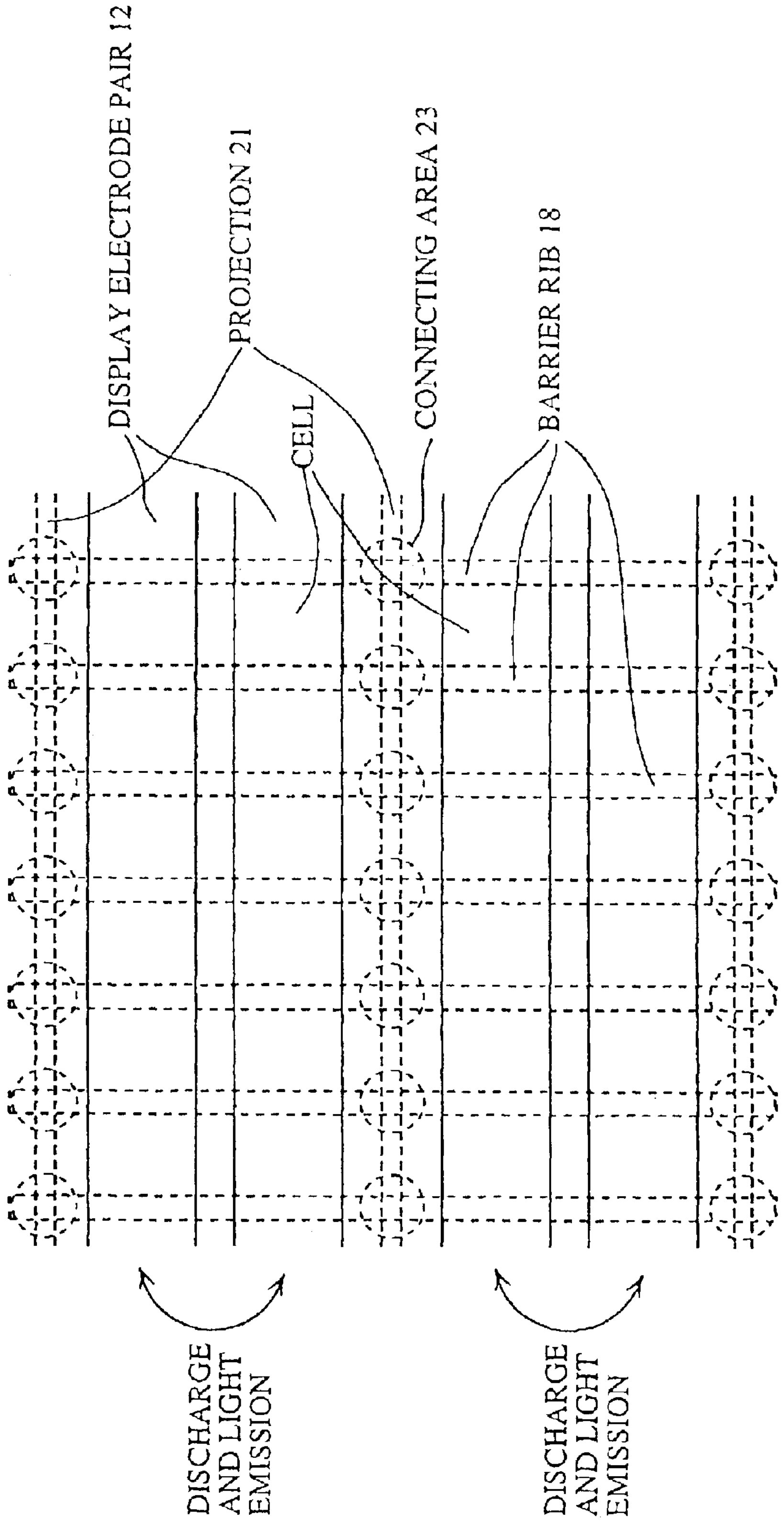
FIG. 5 is a plan view showing connecting areas of the front and back panel members of the PDP in the second embodiment.

FIG. 5 illustrates how the connecting areas are scattered. As shown in the drawing, the front panel member PA1 and the back panel member PA2 are connected only in areas (connecting areas) 23 where the projections 21 intersect the barrier ribs 18.

In other words, the front panel member PA1 and the back panel member PA2 are not connected along the entire top surfaces of the barrier ribs 18 as in the first embodiment. This means gaps exist between the front panel member PA1 and the barrier ribs 18. However, since the connecting areas are widely distributed across the entire surface, noise caused by vibrations of the substrates which occur during actual drive is very small. Hence the noise level can be suppressed within 30 dB.

The noise level varies depending on the number of barrier ribs 18 which are provided with the connecting material Bd. So long as at least one barrier rib 18 is connected to the front panel member PA1 at the center of the image display area, the noise level can be limited to 30 dB or less. Therefore, if all barrier ribs 18 are connected to the front panel member PA1 as above, the noise level can be reduced to substantially zero.

In addition, the total area where the front panel member PA1 and the back panel member PA2 are connected to each other is smaller when compared with the first embodiment. Accordingly, there is little danger of the connecting material Bd entering into the cells. Hence problems such as a decrease in cell opening ratio and an unevenness in image display can be prevented.

Furthermore, with the provision of the projections 21, the height of the cells increases by the thickness of the projections 21 when compared with the case where no projections 21 are provided. This means the space volume of the cells increases too. As a result, the luminous efficiency of each cell can be improved. Also, with the provision of the projections 21, the conductance between adjacent cells increases, with it being possible to improve the evacuation efficiency in the PDP.

Figure 6:
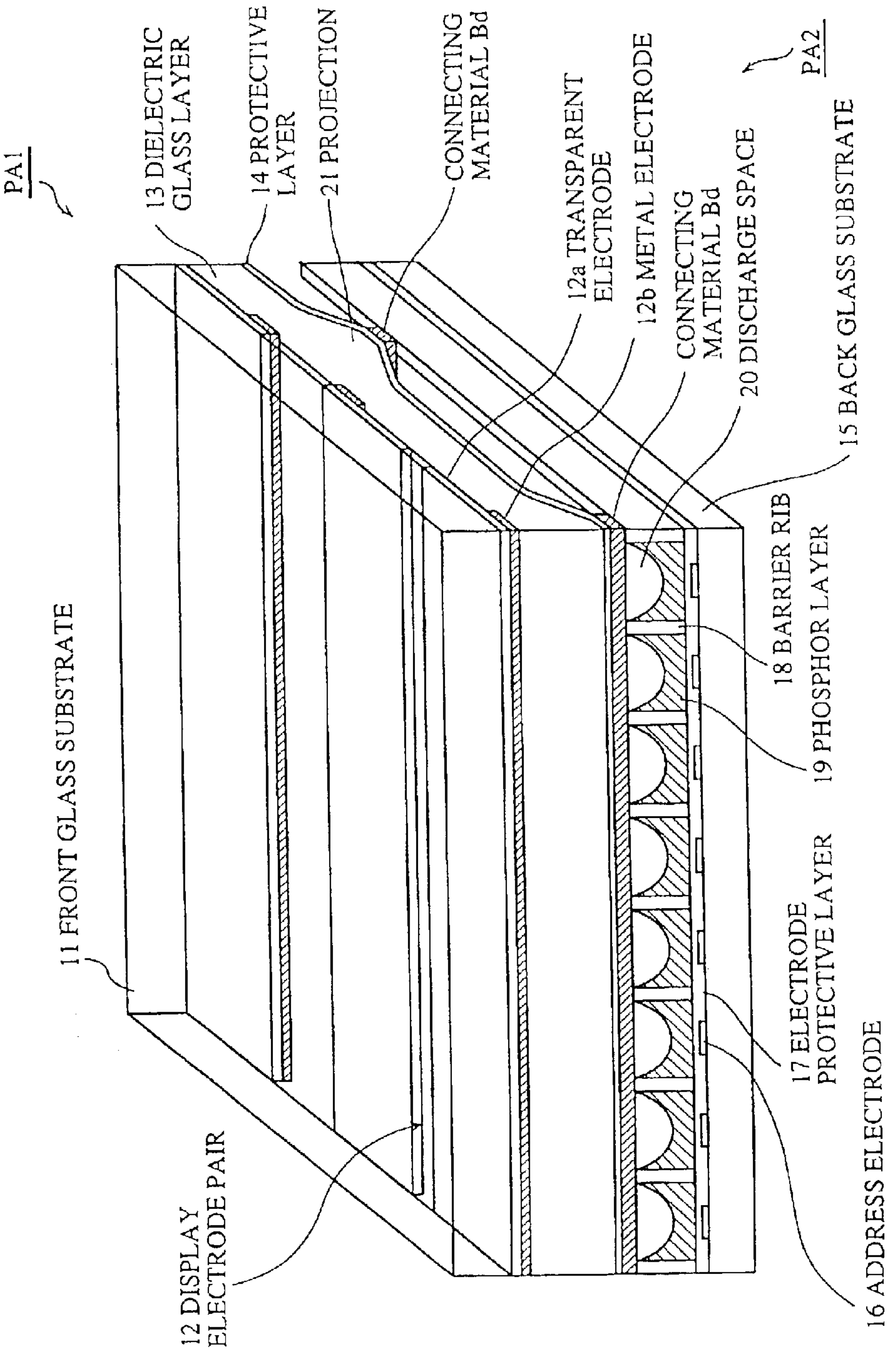
FIG. 6 is a perspective view showing a relevant part of another construction of the PDP in the second embodiment.

Though the connecting material Bd is provided on the top surfaces of the barrier ribs 18 in the above example, it may instead be provided on the projections 21, as shown in FIG. 6.

Figure 7:
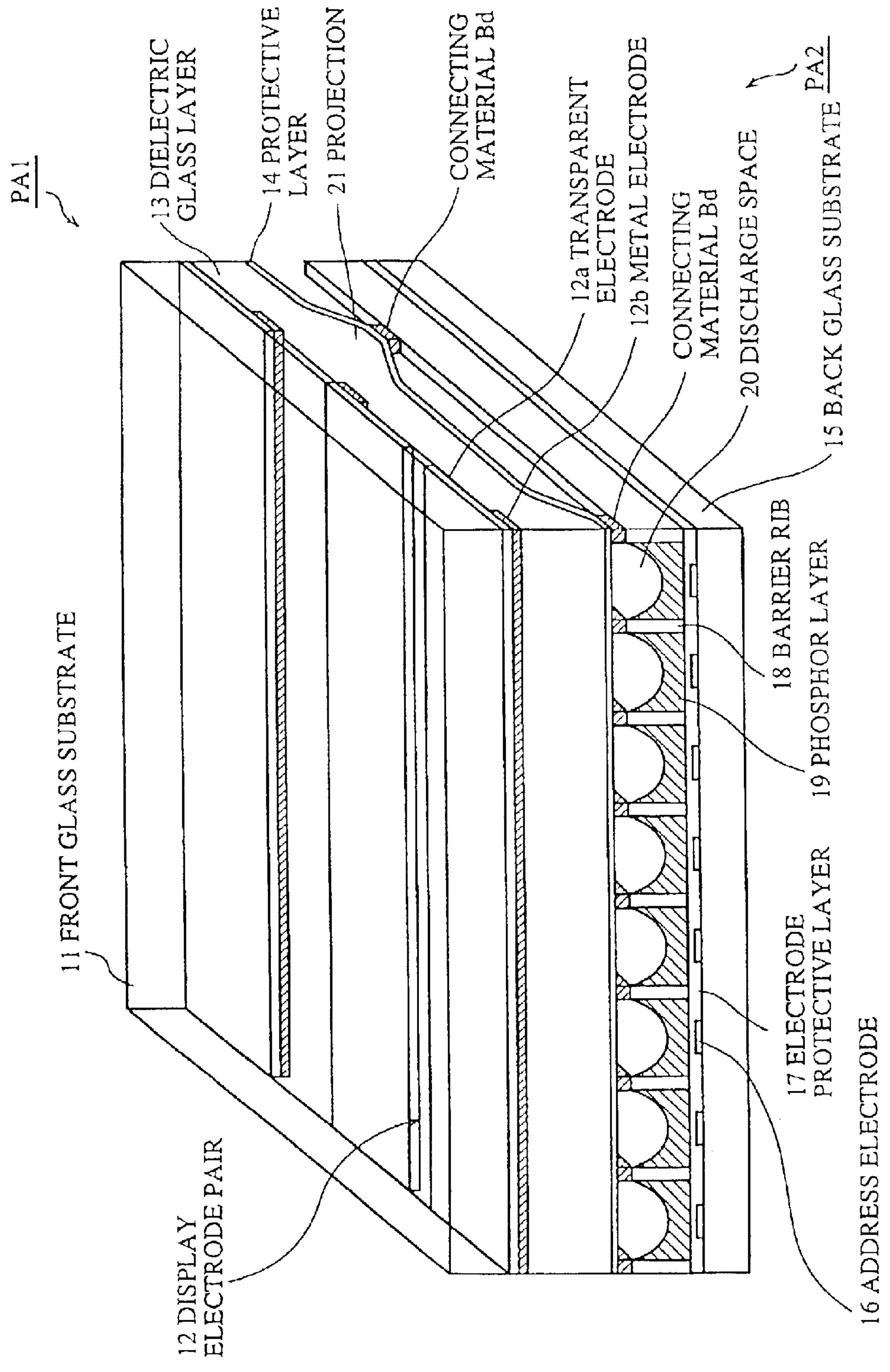
FIG. 7 is a perspective view showing a relevant part of another construction of the PDP in the second embodiment.

Also, the connecting material Bd may be selectively provided only to the connecting areas of the projections 21 or top surfaces of the barrier ribs 18, as shown in FIG. 7. This saves the connecting material Bd used for the areas other than the connecting areas, with it being possible to reduce manufacturing costs to a certain extent.

The following explains the locations, shape, and formation method of the projections 21.

First, it is preferable to provide the projections 21 between adjacent cells, as shown in FIG. 5.

The reason for this is given below. If a projection is formed within a cell, that is, between two display electrodes that form a pair, the connecting material enters into the cell. This causes the cell opening ratio to decrease. Also, the amount of transmitted light generated by discharge decreases, thereby incurring an uneven image display. On the other hand, if the projection is formed between adjacent cells, such problems can be avoided.

The same effects can be achieved in the first embodiment by distributing the areas where the connecting material Bd is applied. However, when the projections 21 are provided as in this embodiment, the connecting areas can be distributed without deliberately scattering the connecting material Bd on the top surfaces of the barrier ribs 18. This saves time in the manufacturing procedure.

Figure 8:
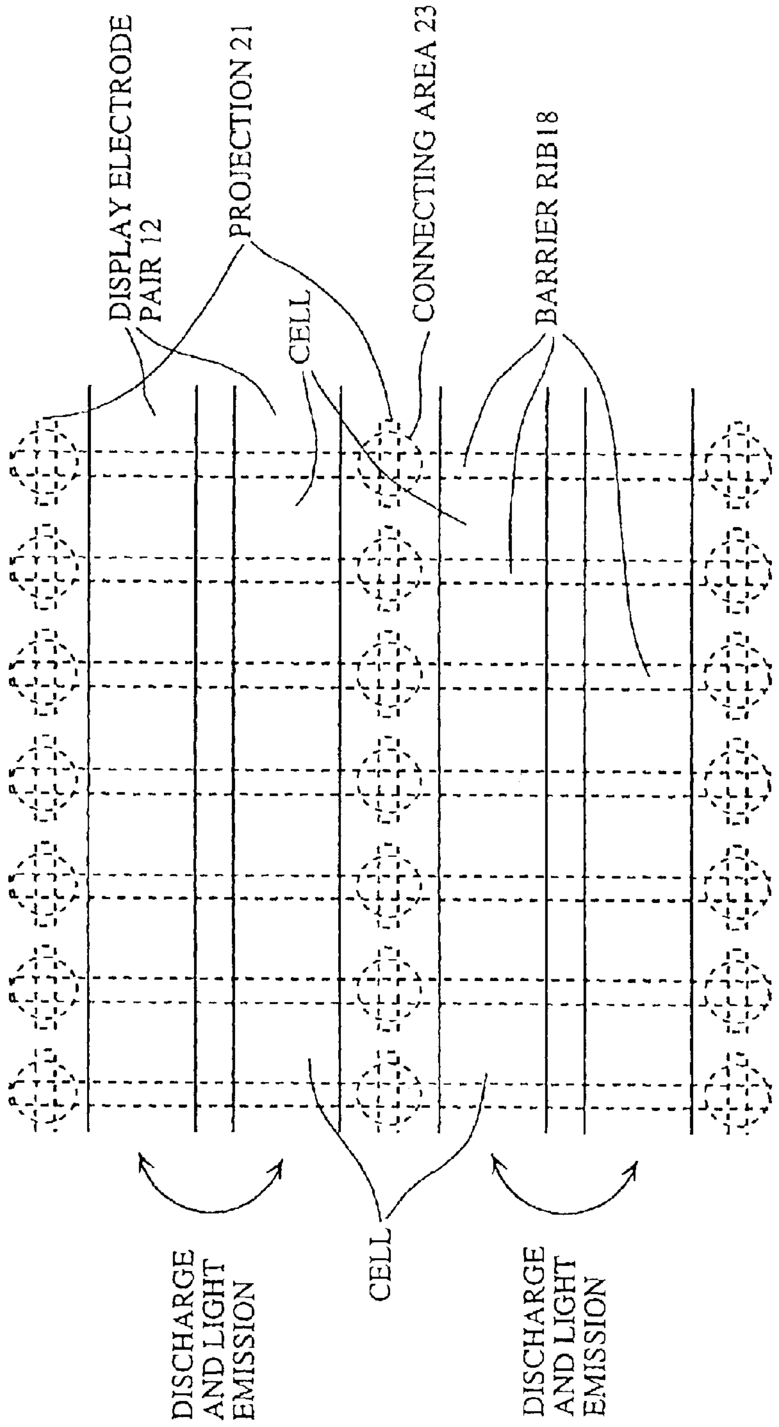
FIG. 8 is a plan view showing connecting areas of the front and back panel members of the PDP in the second embodiment.

Also, though the projections 21 have the shape of continuous stripes in the above example, they may have gaps as shown in FIG. 8. By widely distributing many small projections 21 in this way, when sealing the front panel member PA1 with the back panel member PA2, the connecting material Bd provided on top of the barrier ribs 18 comes into contact with these projections 21, so that the front panel member PA1 and the back panel member PA2 can be connected in the connecting areas which are scattered as in the above example.

Figure 9:
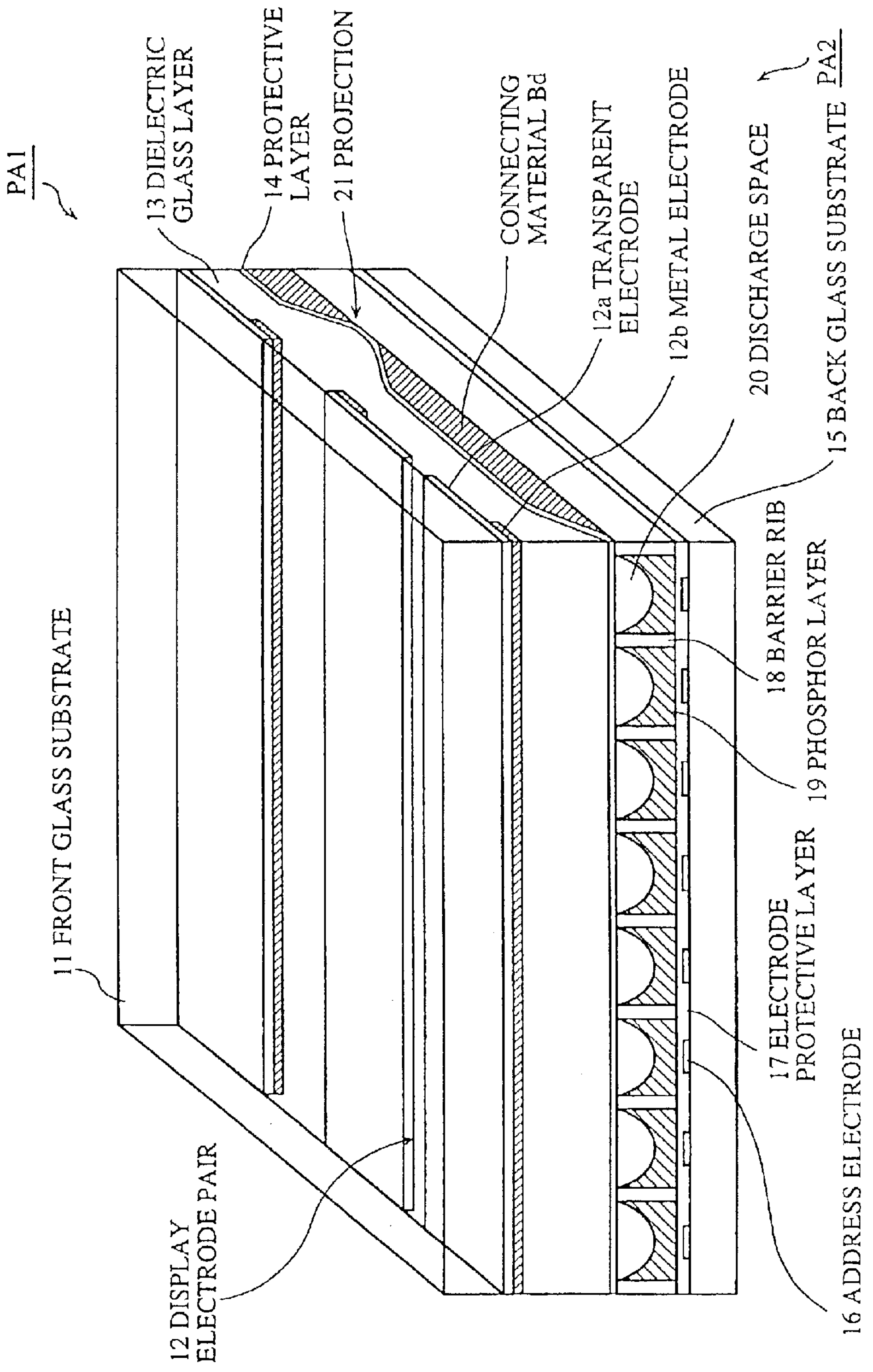
FIG. 9 is a perspective view showing a relevant part of another construction of the PDP in the second embodiment.

Here, it is preferable to apply the connecting material Bd with a thickness substantially equal to the projections 21, so that no gaps remain between the front panel member PA1 and the back panel member PA2 when they are sealed together, as shown in FIG. 9. This increases the connection strength and suppresses the occurrence of crosstalk.

The projections 21 can be formed as follows. Basically, after the formation of the dielectric glass layer 13, a projection forming material is selectively provided at desired locations in an aligned state, to form the projections 21.

In more detail, a screen plate having openings is aligned with the front glass substrate 11 so that the openings correspond to the areas where the projections 21 are to be formed, and then the projection forming material is applied.

The projections 21 may also be formed by patterning a dielectric paste which contains a photosensitive material, using photolithography.

The projections 21 may also be formed as follows. After the formation of the dielectric glass layer 13, a photosensitive resist film layer is formed, and patterning is performed using photolithography. Following this, the resist is removed by sandblasting, thereby forming the projections 21.

Figure 10:
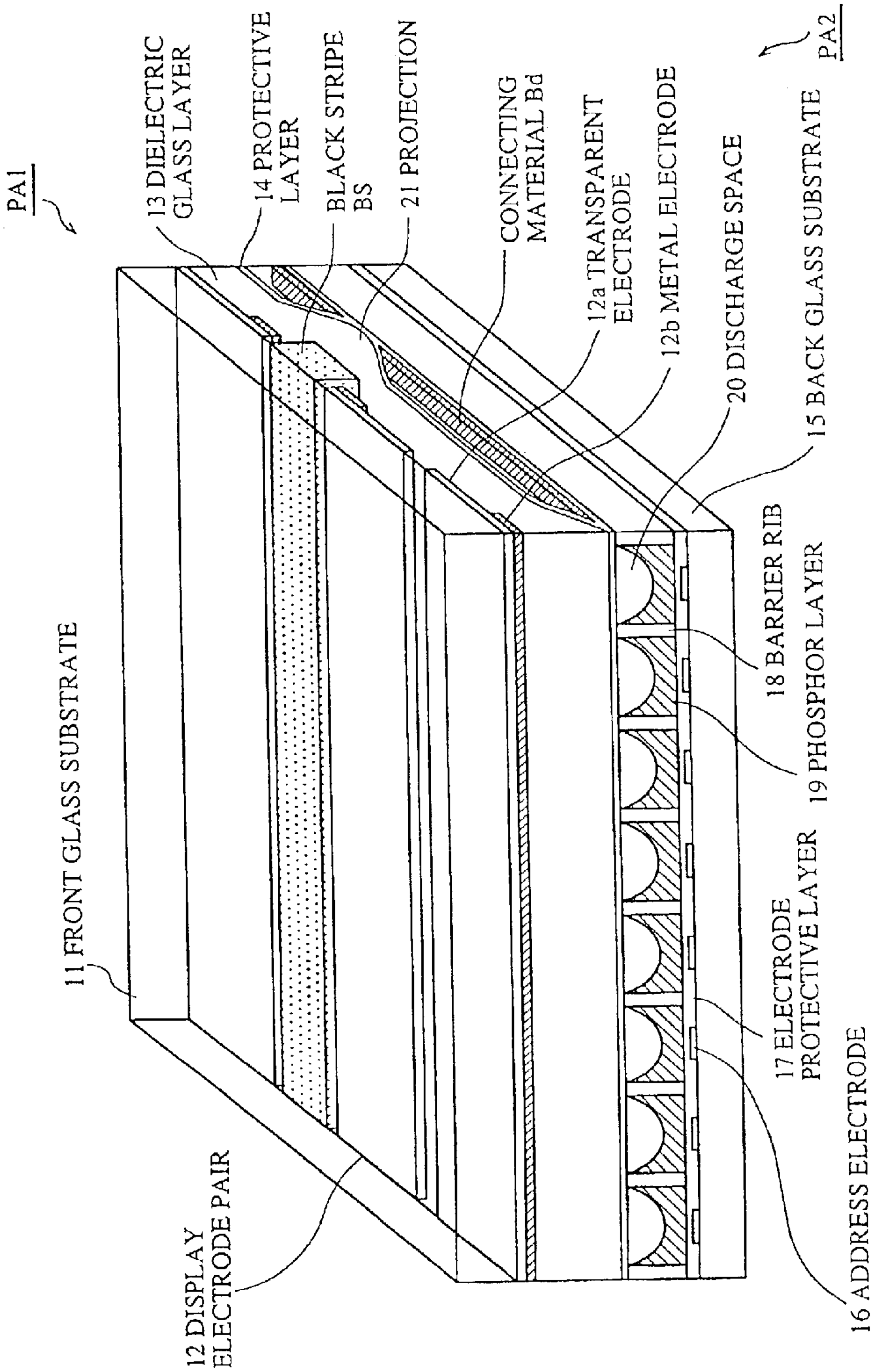
FIG. 10 is a perspective view showing a relevant part of another construction of the PDP in the second embodiment.
Figure 11:
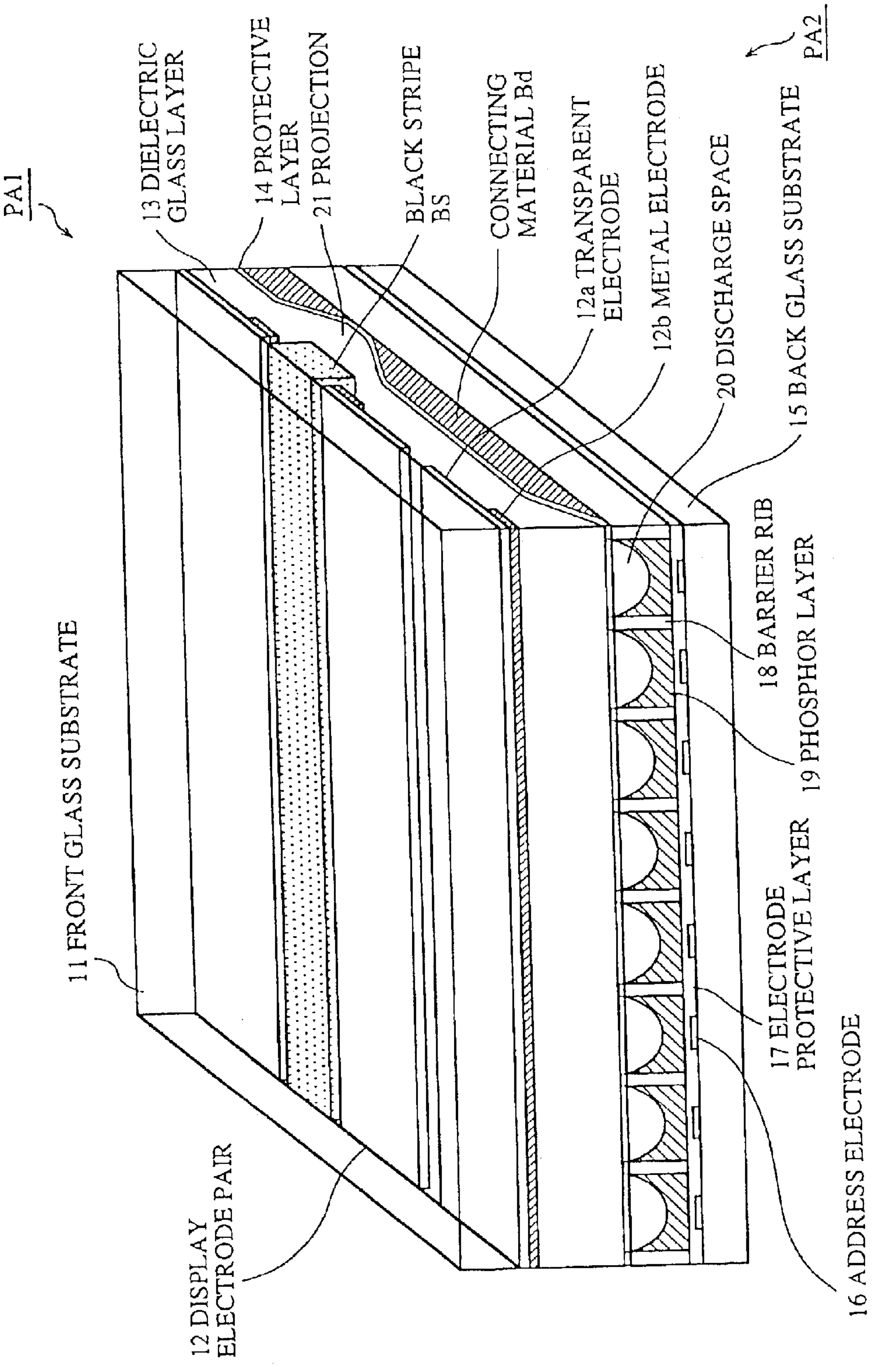
FIG. 11 is a perspective view showing a relevant part of another construction of the PDP in the second embodiment.

As an alternative, black stripes BS may be formed between adjacent display electrode pairs 12, as shown in FIGS. 10 and 11. This being so, by forming the dielectric glass layer 13 so as to cover the black stripes BS, the surface of the dielectric glass layer 13 rises by the thickness of the black stripes BS, thereby forming the projections 21.

In general, it is preferable to use a colorless and transparent material for the dielectric glass layer 13, in order to allow light emitted from the phosphors excited by ultraviolet light to pass through the front panel member PA1.

Therefore, in principle the projections 21 need be formed from the same colorless and transparent material as the dielectric glass layer 13.

Figure 12:
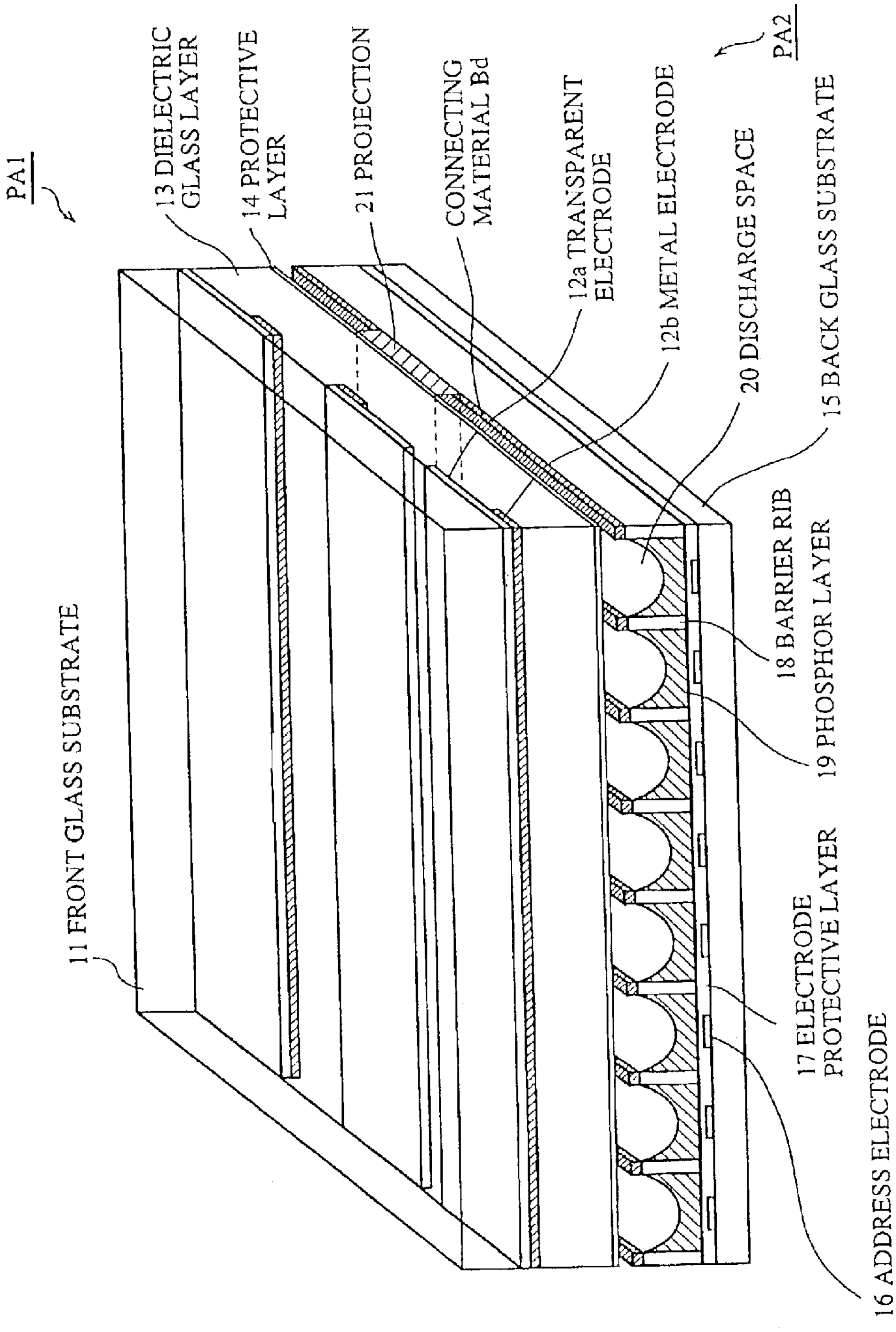
FIG. 12 is a perspective view showing a relevant part of another construction of the PDP in the second embodiment.
Figure 13:
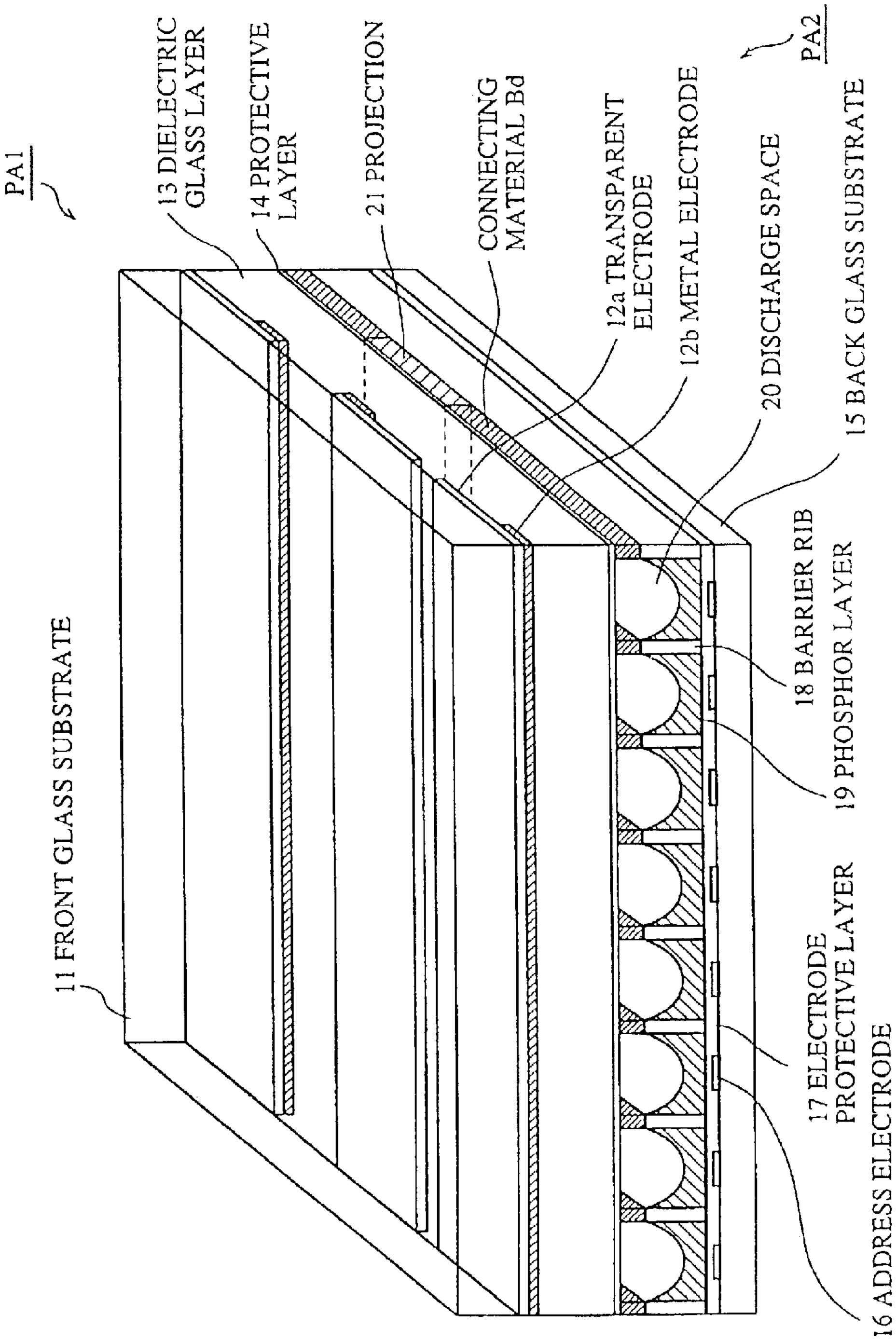
FIG. 13 is a perspective view showing a relevant part of another construction of the PDP in the second embodiment.

However, when the projections 21 are formed between adjacent cells, i.e. in non-luminous areas within the image display area, a material of black or other dark color may be used for the projections 21, as shown in FIGS. 12 and 13. Such projections 21 cause no loss of display image quality, since they are provided in the non-luminous areas. Besides, the use of such a material helps improve the display contrast. As a colored material, the same material as the barrier ribs 18 may be used. In this way, the number of materials used is reduced, with it being possible to reduce costs.

Also, the projections 21 may be formed from the connecting material Bd itself.

Third Embodiment

The third embodiment is characterized by the sealing process for sealing the front panel member PA1 and the back panel member PA2 together. The following description focuses on this point. Note that the front panel member PA1 used here is a conventional front panel that does not have projections.

FIG. 14 illustrates the sealing process.

Figure 14A:
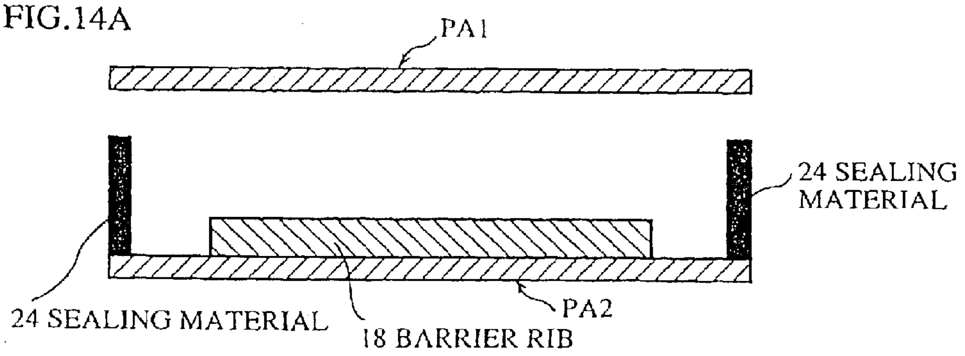
FIG. 14 illustrates a sealing process in the third embodiment of the invention.

Prior to the sealing process, a sealing material 24 is interposed between the facing surfaces of the front panel member PA1 and back panel member PA2 along the outer edges, in the form of layer (FIG. 14A). This sealing material 24 is applied so as to form a greater height than the barrier ribs 18.

Figure 14B:
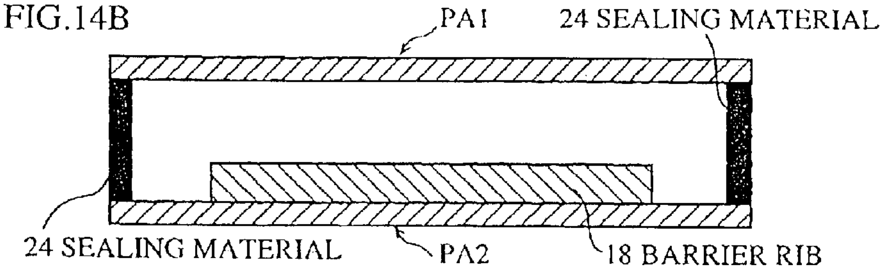

Following this, the front panel member PA1 and the back panel member PA2 are aligned. Here, since the layer of the sealing material 24 formed at the outer edges of the front panel member PA1 and back panel member PA2 is higher than the barrier ribs 18 formed in the display area, the front panel member PA1 and the back panel member PA2 are in contact with each other only at their outer edges through the sealing material 24 (FIG. 14B). The sealing material 24 has not been softened at this stage, and so maintains a fixed shape.

Figure 14C:
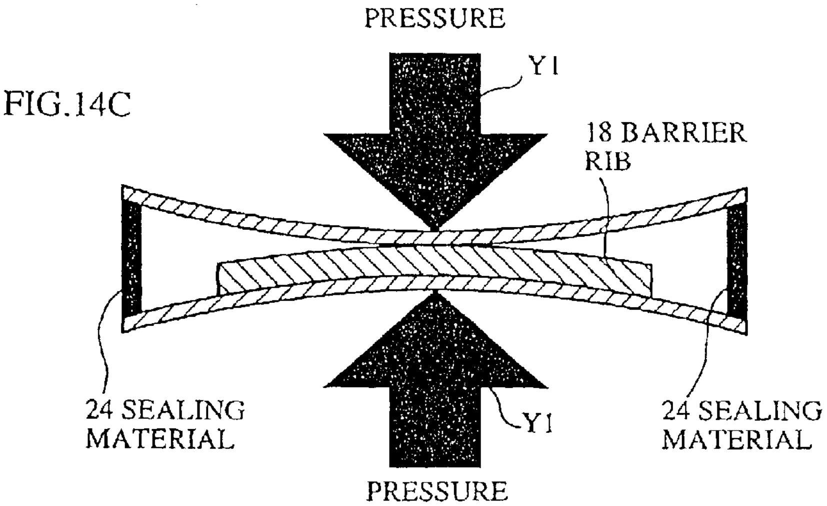

After this, the center of the front panel member PA1 and the center of the back panel member PA2 are pressed from both sides (FIG. 14C). Due to these pressures indicated by arrows Y1, the front panel member PA1 and the back panel member PA2 deflect inward at the center with respect to the layer of the sealing material 24 as the fulcrum, as shown in the drawing. As a result, the gap between the front panel member PA1 and the back panel member PA2 becomes smaller.

Figure 14D:
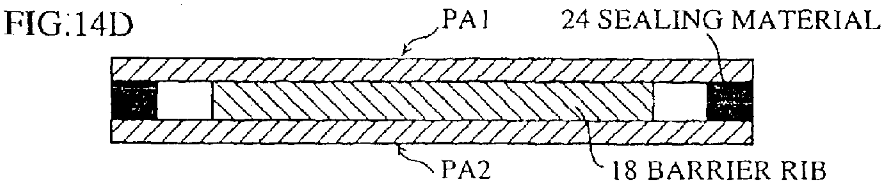

This being so, the front panel member PA1 and the back panel member PA2 are heated using a heater or the like, to soften the sealing material 24. The softened sealing material 24 spreads out, as a result of which the top surfaces of the barrier ribs 18 come into contact with the inner surface of the front panel member PA1. Once the sealing material 24 has been softened and spread out sufficiently, restoring force acts on the front panel member PA1 and the back panel member PA2 due to their elasticity. As a result, the top surfaces of the barrier ribs 18 and the front panel member PA1 come into contact with each other not only at the center but uniformly across the entire surfaces (FIG. 14D).

The construction is cooled in this state, to seal the front panel member PA1 and the back panel member PA2 with there being no gaps between the barrier ribs 18 and the front panel member PA1.

In this way, the occurrence of noise or crosstalk is suppressed, with it being possible to realize a high quality PDP.

Here, it is preferable to form the layer of the sealing material 24 to have a height which is no smaller than the sum of the height of the barrier ribs 18 and the amount of deflection, waviness, and warping of the front panel member PA1 and back panel member PA2, for the following reason. If the top surfaces of the barrier ribs 18 are partially in contact with the inner surface of the front panel member PA1 in FIG. 14A, pressure cannot be exerted uniformly, so that the front panel member PA1 and the back panel member PA2 cannot make uniform contact with each other.

Also, it is preferable to exert pressure on the center of the front panel member PA1 and back panel member PA2 in the sealing process. This allows the front panel member PA1 to make uniform contact with the top surfaces of all barrier ribs 18. As a result, the degree of adhesion between the front panel member PA1 and the back panel member PA2 improves.

The application of pressure in the sealing process can be done using the pressure difference of the inside and outside of the panel. For example, a pressure-reducing pump may be inserted into the inner space of the panel. This being so, when the sealing material 24 has softened and the inner space has become airtight, the pressure-reducing pump is activated to reduce the pressure in the inner space. As an alternative, the panel prior to the sealing process may be put in a gastight enclosure. This being so, when the sealing material 24 has softened and the inner space has become airtight, gas is introduced into the enclosure to apply pressure. This creates a pressure difference between the inside and outside of the panel.

Also, the application of pressure in the sealing process can be carried out using a magnetic force between two magnets of opposite polarity which are positioned so that the front panel member PA1 and the back panel member PA2 lie therebetween.

Figure 15:
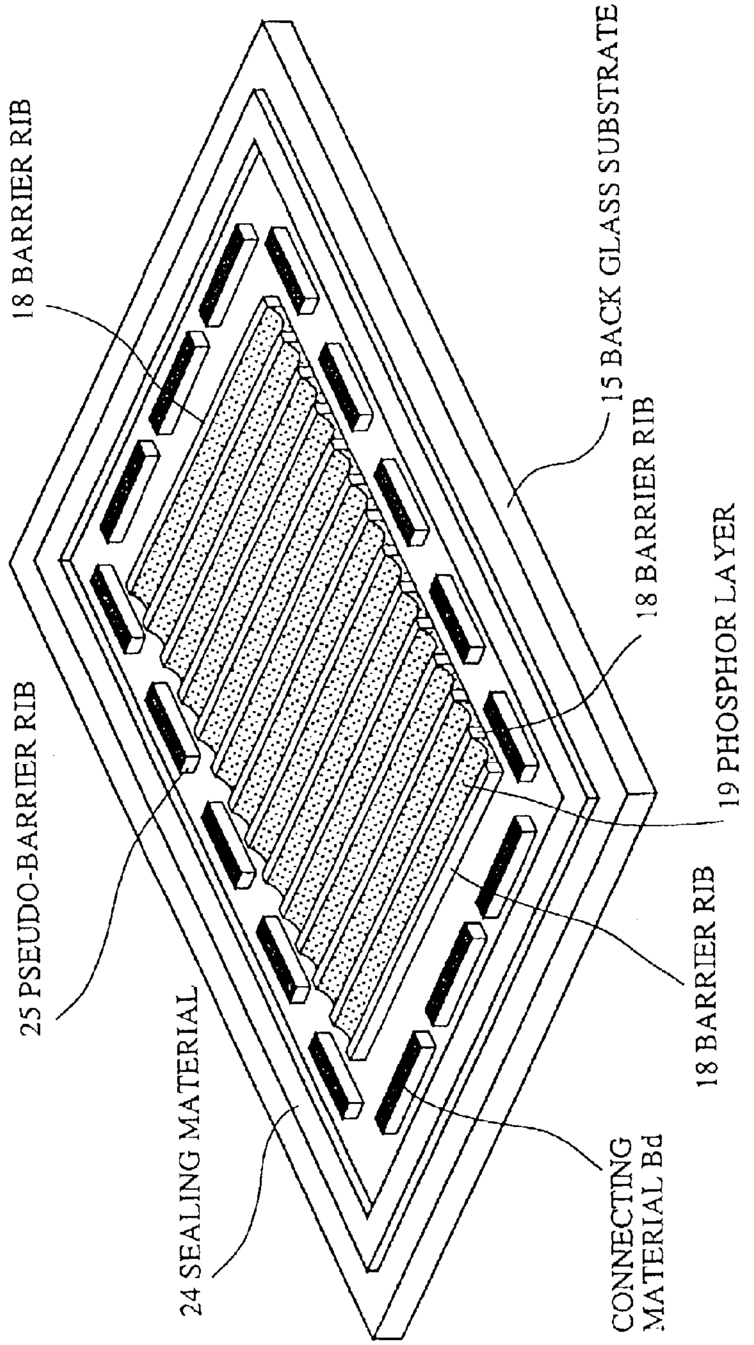
FIG. 15 is a perspective view showing a modification to the third embodiment.

This embodiment describes the case where the barrier ribs 18 and the front panel member PA1 are not connected to each other. However, as shown in FIG. 15, pseudo-barrier ribs 25 may be provided in a region that surrounds the image display area but is more central than the area where the sealing material 24 has been arranged. If the connecting material is provided on top of these pseudo-barrier ribs 25 to connect to the front panel member PA1, the adhesion between the front panel member PA1 and the back panel member PA2 is strengthened.

Also, when this embodiment is combined with the first and second embodiments, the two panel members are sealed while pressing their center areas, so that they are reliably connected to each other at the center.

The present invention is applicable not only to gas discharge panels such as PDPs but also to other display panels such as field emission displays.

Industrial Applicability

The present invention can be used as display panels for image display in televisions, computer monitors, and the like.

What is claimed is:

1. A manufacturing method for a display panel including a first panel member and a second panel member which has a plurality of strip-shaped barrier ribs, the first panel member and the second panel member being sealed together by a sealing material that is provided between the first panel member and the second panel member in a peripheral area so as to surround the plurality of barrier ribs, characterized by comprising the steps of:

providing, before the first panel member and the second panel member are sealed together, the sealing material in a peripheral area of the first panel member or the second panel member so as to form a height that is greater than a height of the plurality of barrier ribs; and sealing, after the sealing material providing step, the first panel member and the second panel member by softening the sealing material while pressing the first panel member and the second panel member against each other in an area which is more central than the peripheral area.

2. The manufacturing method of claim 1, wherein in the sealing step, the first panel member and the second panel member are pressed against each other in a center area.

3. The manufacturing method of claim 1, wherein in the sealing step, the pressing is performed using a difference between a pressure inside the display panel and a pressure outside the display panel.

4. The manufacturing method of claim 1, wherein in the sealing step, the pressing is performed using a magnetic force between magnets of opposite polarity which are positioned so that the first panel member and the second panel member lie therebetween.

5. The manufacturing method of claim 1, wherein in the sealing material providing step, the sealing material is provided so as to form a height that is no smaller than a sum of the height of the plurality of barrier ribs and an amount of deflection, waviness, and warping of the first panel member and the second panel member.

6. A display panel including a first panel member and a second panel member which has a plurality of strip-shaped barrier ribs, the first panel member and the second panel member being sealed together by a sealing material that is provided between the first panel member and the second panel member in a peripheral area which surrounds the plurality of barrier ribs, characterized by being manufactured by:

providing, before the first panel member and the second panel member are sealed together, the sealing material in a peripheral area of the first panel member or the second panel member so as to form a height that is greater than a height of the plurality of barrier ribs; and sealing, after the sealing material is providing, the first panel member and the second panel member by softening the sealing material while pressing the first panel member and the second panel member against each other in an area which is more central than the peripheral area.

* * * * *